United States Patent [19]

Fry

[11] 4,322,693
[45] Mar. 30, 1982

[54] AMMONIA LASER WITH SIMULTANEOUS TRANSITIONS FROM SUBSTRATES OF DIFFERENT K-VALUES

[75] Inventor: Stephen M. Fry, Woodland Hills, Calif.

[73] Assignee: Hughes Aircraft Company, Culver City, Calif.

[21] Appl. No.: 826,787

[22] Filed: Aug. 22, 1977

[51] Int. Cl.³ .................... H01S 3/094; H01S 3/223
[52] U.S. Cl. ........................... 372/60; 372/55; 372/69
[58] Field of Search .................. 330/4.3; 331/94.5 G, 331/94.5 P

[56] References Cited

PUBLICATIONS

Garing et al., J. Molecular Spectroscopy, vol. 3 (1959), pp. 496–527.
Chang, Optics Communications, vol. 2, No. 2, Jul. 1970, pp. 77–80.
Hinkley et al., Applied Optics, vol. 15, No. 7, Jul. 1976, pp. 1653–1655.
Chang et al., Appl. Physics Letters, vol. 29, No. 11, Dec. 1, 1976, pp. 725–727.
Danielewicz et al., Applied Physics Letters, vol. 29, No. 9, Nov. 1, 1976, pp. 557–559.
Gullberg et al., Physica Scripta, vol. 8, (1973), pp. 177–182.
Chang et al., Applied Physics Letters, vol. 28, No. 9, (May 1, 1976), pp. 526–528.

*Primary Examiner*—William D. Larkins
*Attorney, Agent, or Firm*—Paul M. Coble; W. H. MacAllister

[57] ABSTRACT

A multi-line $NH_3$ laser is disclosed pumped by a multi-longitudinal mode and multi-transverse mode laser beam from a high-pressure $CO_2$ laser operating on the R(30) 9.2 $\mu$m transition. The resulting comb of pumping wavelengths simultaneously pumps several close-lying sR(5,K) transitions in ammonia from the symmetric ground state to the antisymmetric $\nu_2=1$ state, providing simultaneous lasing on a plurality of sP(7,K) transitions of different K-values. A plurality of sP(5,K) ammonia laser lines originating in the $\nu_2=1$ antisymmetric band and terminating in the depleted lower pump levels are also generated.

5 Claims, 3 Drawing Figures

AMMONIA LASER WITH SIMULTANEOUS TRANSITIONS FROM SUBSTRATES OF DIFFERENT K-VALUES

BACKGROUND OF THE INVENTION

This invention relates to lasers, and more particularly, it relates to a multiple wavelength ammonia laser pumped by a carbon dioxide laser.

Recently there has been increased interest in laser-pumped lasers wherein a laser beam from a first laser is used to pump a second laser which provides the desired output beam. This type of laser finds application in a number of fields including isotope separation, laser photochemistry, high resolution spectroscopy, and air pollution monitoring.

In the foregoing and other applications it is often necessary to utilize a laser beam at a particular frequency. Since the frequency of a laser beam depends upon the energy level structure of the medium used in generating the beam, if one desires a laser beam at a particular frequency he must select the particular laser that most closely fits the desired frequency condition. Since there are some desired frequencies which do not match any laser output frequency, a need exists for developing lasers which can be tuned to provide an output at any desired frequency in a range of frequencies.

In the case of a gas laser, tunability can usually be enhanced by increasing the pressure of the gaseous working medium and thereby Lorentz broaden the linewidth of the lasing transition. Since lasers excited by means of an electric discharge have a tendency to arc at high operating gas pressures, and since some laser beams are closely matched in energy to absorbing transitions in certain laser gases, laser-pumped lasers offer great potential for providing tunable lasers of high efficiency and reliability.

One particular laser-pumped laser combination which is receiving attention in the scientific community involves optically pumping ammonia ($NH_3$) with the output from a carbon dioxide ($CO_2$) laser. Carbon dioxide lasers are not only readily available, but these lasers provide output wavelengths near ammonia absorption resonances. In fact, both the absorption spectra of the ammonia molecule and the output lines from carbon dioxide lasers have been studied extensively and are well tabulated (see, for example, J. S. Garing et al, "The Low-Frequency Vibration Rotation Bands of the Ammonia Molecule", *Journal of Molecular Spectroscopy*, Vol. 3 (1959), pages 496–527; T. Y. Chang, "Accurate Frequencies and Wavelengths of $CO_2$ Laser Lines", *Optics Communications*, Vol. 2, No. 2 (July 1970), pages 77–80; and E. D. Hinkley et al "Long-Path Monitoring: Advanced Instrumentation with a Tunable Diode Laser", *Applied Optics*, Vol. 15, No. 7 (July 1976), pages 1653–1655).

In recent years a variety of ammonia lasers have been developed pumped by different carbon dioxide laser lines and providing respective outputs at different ammonia transistion wavelengths. Initially, ammonia output wavelengths were obtained generally in the 30 $\mu$m to 400 $\mu$m range (see K. Gullberg et al, "Submillimeter Emission from Optically Pumped $^{14}NH_3$", *Physica Scripta*, Vol. 8 (1973), pages 177–182). More recently, several additional ammonia output lines have been achieved at shorter wavelengths ranging from 11.46 $\mu$m to 12.81 $\mu$m (see T. Y. Chang et al, "Laser Action at 12.812 $\mu$m in Optically Pumped $NH_3$", *Applied Physics Letters*, Vol. 28, No. 9 (May 1, 1976), pages 526–528; E. J. Danielewicz et al, "High-Power Vibration-Rotation Emission from $^{14}NH_3$ Optically Pumped Off Resonance", *Applied Physics Letters*, Vol. 29, No. 9 (Nov. 1, 1976), pages 557–559; and T. Y. Chang et al, "Off-Resonant Infrared Laser Action in $NH_3$ and $C_2H_4$ Without Population Inversion", *Applied Physics Letters*, Vol. 29, No. 11 (Dec. 1, 1976), pages 725–727).

A particular carbon dioxide laser line which has been useful in pumping ammonia to produce laser radiation at 12.08 $\mu$m as well as at 67 $\mu$m is the R(30) carbon dioxide laser line at 9.2 $\mu$m. However, in the past, neither the R(30) line nor any other carbon dioxide laser line had ever produced a plurality of ammonia lines emanating from respective energy substates characterized by different values of the rotational quantum number K (which represents the component of molecular angular momentum about the unique axis of the molecule).

SUMMARY OF THE INVENTION

It is a specific object of the present invention to provide an ammonia laser pumped by a carbon dioxide laser and which lases simultaneously on a plurality of ammonia lines emanating from respective energy substates characterized by different rotational quantum numbers K.

It is a more general object of the invention to provide a laser-pumped laser which generates a plurality of output wavelengths sufficiently near one another so as to readily facilitate pressure broadening to achieve tunability of the laser output over a continuous wavelength range.

It is a further object of the invention to provide a multiple-transition laser-pumped laser which is tunable over an exceptionally wide wavelength range greater than the sum of the tuning ranges of the individual lasing transitions.

It is still another object of the invention to provide an efficient and reliable, tunable laser-pumped laser which requires less pumping power than the prior art to tune the laser over a given wavelength range.

In a laser according to the invention, a carbon dioxide laser tuned to the R(30) transition of the 001-020 band provides a pumping laser beam at a wavelength of approximately 9.2 $\mu$m and having a plurality of longitudinal modes and a plurality of transverse modes. The pumping beam irradiates a contained quantity of ammonia gas with sufficient power to simultaneously excite at least two a(6,K) energy substates of the $\nu_2=1$ (J,K) vibrational manifold of ammonia molecules to a condition of population inversion with respect to respective s(7,K) energy substates of the ground (J,K) vibrational manifold having the same K value as the associated a(6,K) substate, where K is an integer not greater than 5. An optical resonator in optical communication with the excited ammonia gas supports simultaneous laser oscillation on the respective sP(7,K) transitions corresponding to the aforementioned condition of population inversion.

The pumping laser beam may have sufficient power to additionally simultaneously excite at least one of the a(4,K) energy substates of the $\nu_2=1$ (J,K) vibrational manifold of ammonia molecules to a condition of population inversion with respect to the s(5,K) energy substate of the ground (J,K) vibrational manifold having the same K value as the excited a(4,K) substate, where K is an integer not greater than 4. Thus, oscillation on at least one sP(5,K) transition may be achieved simultaneously with the aforementioned oscillation on a plurality of sP(7,K) transitions.

Additional objects, advantages and characteristic features of the invention will become readily apparent from the following detailed description of a preferred embodiment of the invention when considered in conjunction with the accompanying drawings.

DESCRIPTION OF A PREFERRED EMBODIMENT

Figure 1:
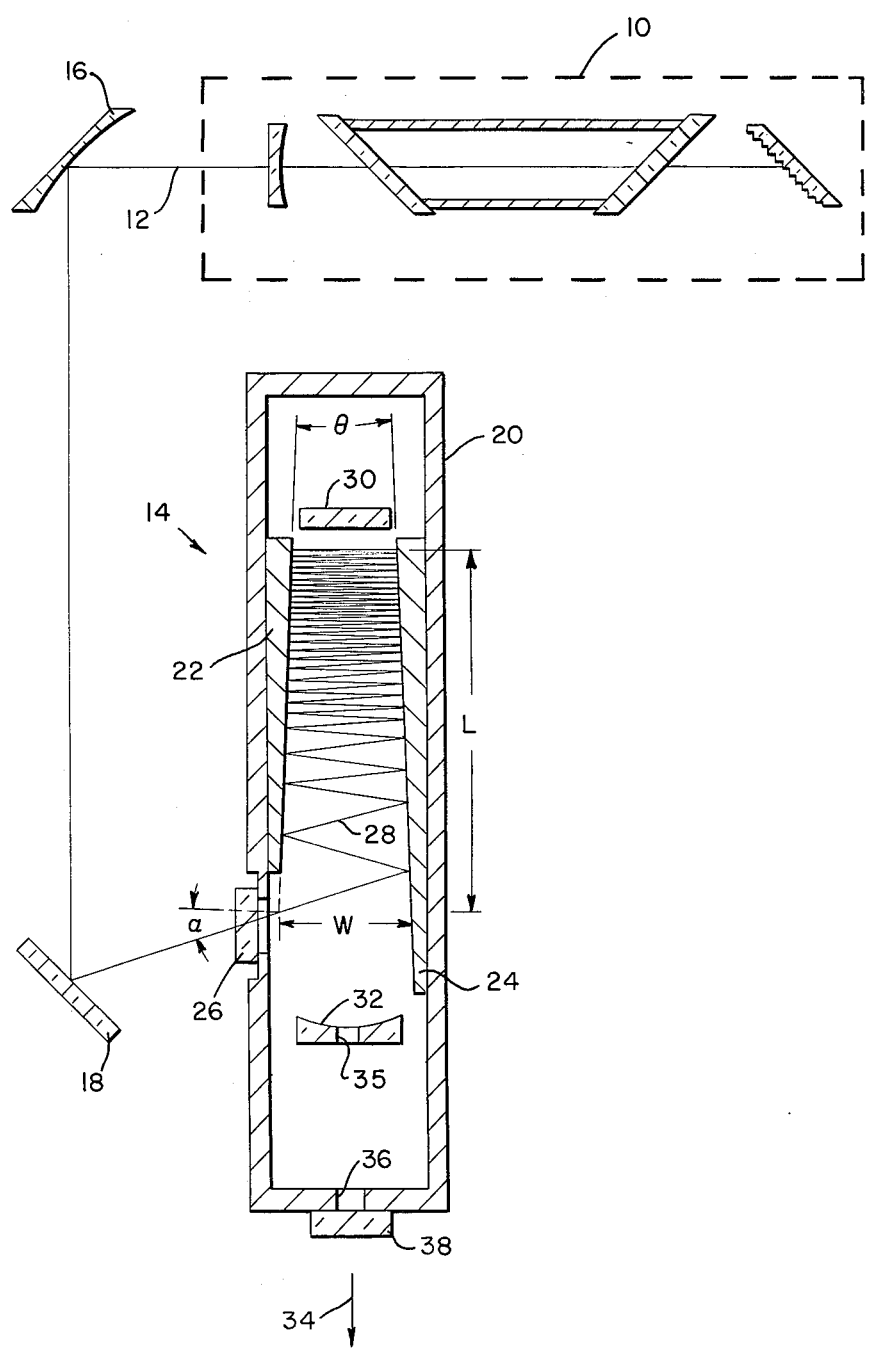
FIG. 1 is a schematic diagram illustrating a laser-pumped laser according to the invention.

Referring to FIG. 1 with greater particularity, a laser-pumped laser according to the invention utilizes a pump laser 10 to generate a pumping laser beam 12 for exciting a main laser 14 which provides the desired laser output. The pump laser 10 is a carbon dioxide ($CO_2$) laser operating on the R(30) 9.2 $\mu$m transition of the 001–020 band and providing an output beam containing a plurality of longitudinal modes and a plurality of transverse modes. A specific exemplary pump laser 10 which has been employed in an arrangement according to the invention was a pulsed, diffraction grating-controlled $CO_2$ TEA laser operated at a pressure of about 800 Torr and providing a multi-transverse and multi-longitudinal mode output extending over an approximately 4 GHz bandwidth centered at about 9.2 $\mu$m. The laser beam pulses 12 were of 3–4 $\mu$sec. duration at energy levels ranging between 0.4 and 1.2 Joules.

Although the pump laser 10 may be located so that the pumping beam 12 travels along a linear path to the main laser 14, a more compact arrangement may be achieved by utilizing one or more beam-deflecting mirrors 16 and 18 to direct the pumping beam 12 into a desired folded path toward the main laser 14. Moreover, in order to elongate the cross-section of the pumping beam 12 for more efficient pumping of the laser 14, one of the mirrors such as 16 may be made with a paraboloidal reflective surface which receives the pumping beam 12 at an angle offset from the paraboloidal axis. In a specific exemplary arrangement constructed according to FIG. 1, a paraboloidal mirror 16 was employed having a 2.5 m focal length and located a distance of approximately 3 m from the input to the laser 14 along the path of the pumping beam 12. Such an arrangement produced at the input to the laser 14 a laser beam having cross-sectional dimensions of approximately 7 mm $\times$ 16 mm, the longer dimension occurring in a plane perpendicular to the plane of FIG. 1.

The main laser 14 includes an elongated housing 20 containing ammonia gas as the laser medium. In a specific exemplary laser which was constructed, housing 20 had a rectangular cross-section of approximately 4 cm $\times$ 4 cm dimensions. However, it should be understood that alternate configurations and dimensions are also suitable and may be employed. In fact, a laser cavity width which more closely matches the diameter (e.g., 1 cm) of the transverse laser mode being generated could result in the achievement of more efficient pumping and higher laser output power.

In order to form a pumping cavity for the laser 14 a pair of wedged mirrors 22 and 24 are respectively mounted on a pair of opposing inner walls of the housing 20. The mirrors 22 and 24 are provided with highly reflective surfaces (formed from a gold coating, for example) facing one another and inclined a preselected oblique angle $\theta$ with respect to one another.

The pumping laser beam 12 is introduced into the laser 14 via a window 26 (of KBr, for example) disposed adjacent to the diverging end of mirror 22 at a predetermined angle $\alpha$ with respect to the normal to the reflective surface of the mirror 22. Due to the converging reflective surfaces of the mirrors 22 and 24, the pumping beam 12 propagates through the laser 14 along a zig-zag path 28 back and forth between the mirrors 22 and 24 in a longitudinal direction toward the converging ends of the mirrors 22 and 24. Moreover, at each reflection from mirror 22 or 24 the angle of reflection with respect to the normal to the surface in question decreases. Eventually, the reflection angle will equal zero or will become negative, causing the pumping beam 12 to reverse its longitudinal direction of propagation and commence a similar zigzag propagation back through the laser 14 in the opposite longitudinal direction.

The relationship between the pumping beam input angle $\alpha$ and the mirror convergence angle $\theta$ which results in a reversal of the longitudinal direction of propagation of the pumping beam 12 after traveling longitudinally through the laser 14 for a distance L is given by $$\alpha = \sqrt{2\theta \left( \frac{L}{W} \right)} ,$$

where W is the width of the laser 14 (i.e., the separation between the reflective surfaces of mirrors 22 and 24) at the region of entrance of the pumping beam 12, and $\alpha$ and $\theta$ are measured in radians. For efficient pumping and maximum laser gain, the pumping beam 12 should propagate longitudinally through the laser 14 to approximately the ends of the wedged mirrors 22 and 24 before it reverses its longitudinal direction of propagation.

A set of exemplary parameter values which have been employed for the parameters $\alpha$, $\theta$, L and W in a laser according to the invention is listed below in Table I:

Table I $\alpha = 15°$ $\theta = 0.5°$

L = 18 cm

W = 4 cm.

It should be understood that the foregoing parameter values are given solely for illustrative purposes, and a wide range of alternate values are also suitable and may be employed.

In order to provide a lasing medium for the laser 14, a quantity of ammonia ($^{14}NH_3$) gas is disposed within the housing 20 at a pressure ranging from about 0.5 to about 4.0 Torr. Also, a buffer gas such as nitrogen or helium may be added, if desired, to pressure broaden the linewidth of the lasing transitions. For a laser arrangement having the aforementioned specific exemplary parameter values, the ammonia gas pressure should not exceed about 4.0 Torr and any buffer gas a pressure of about one atmosphere in order to insure that all of the desired laser lines will be generated. However, increased operating pressures of ammonia and/or buffer gas may be used if the pump rate is increased sufficiently to compensate for collisional depumping of the excited ammonia substates, thereby increasing the laser tuning range in the manner discussed more fully below.

An optical resonator for the laser 14 may be provided by locating a pair of resonator mirrors such as flat mirror 30 and spherical mirror 32 along the axis of the laser 14 beyond the opposite ends of the pumping region. The resonator mirrors 30 and 32 should be sufficiently reflective to support laser oscillation over at least a wavelength range extending from about 11.520 μm to about 12.093 μm and possibly over a substantially greater range depending upon the degree of pressure broadening desired. In order to permit egress of the generated laser beam 34 from the laser 14, one of the resonator mirrors such as 32 may be provided with a coupling hole 35 which is aligned with an aperture 36 in the end of housing 20 and an adjacent output window 38 (of KBr, for example). In a specific exemplary resonator which has been employed in an arrangement according to the invention, both of the mirrors 30 and 32 were gold-coated, with spherical mirror 32 having a 1 m radius of curvature and a 1 mm diameter coupling hole 35. Either or both of the mirrors 30 and 32 may be mounted on suitable gimbals (not shown) to facilitate alignment of the mirrors.

Figure 2:
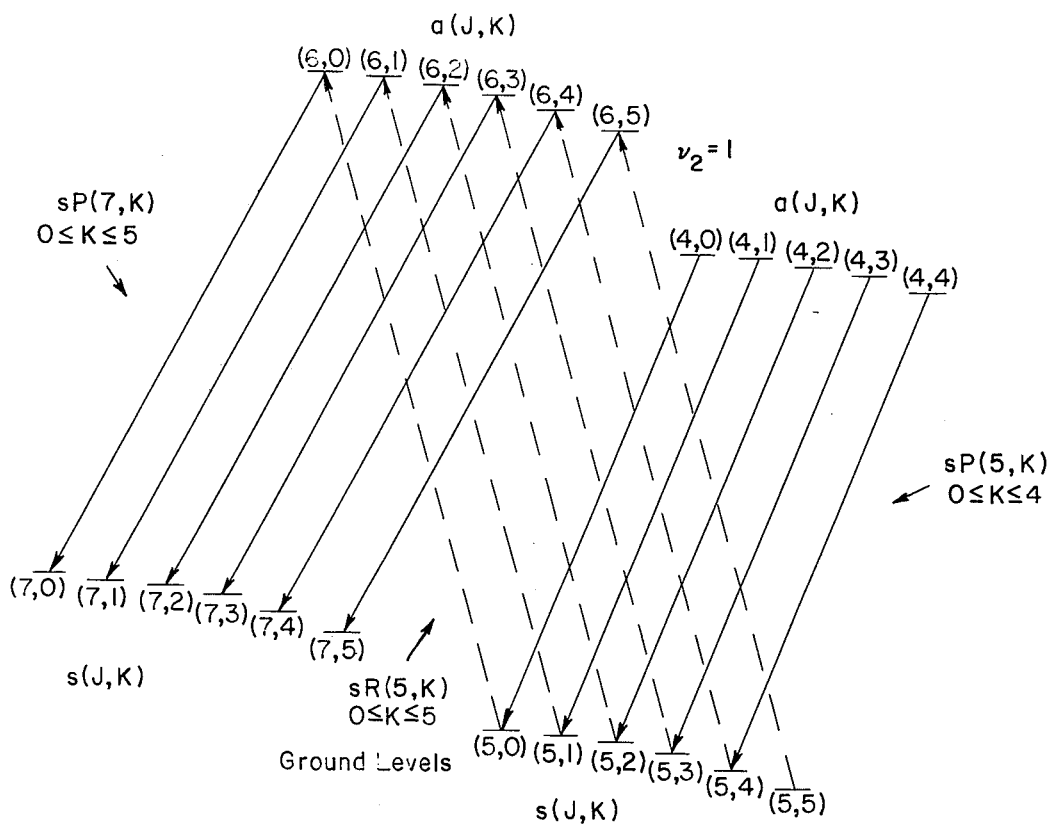
FIG. 2 is an energy level diagram illustrating the pumping and lasing transitions involved in the laser of the invention.

The operation of a laser according to the invention will now be described with reference to FIG. 2 which illustrates the ammonia ($^{14}NH_3$) molecular energy levels and transitions pertinent to the present invention. In FIG. 2 and elsewhere herein the following standard notation for symmetric top molecular energy levels is used. "$\nu_2$" represents the normal vibrational mode wherein the nitrogen atom vibrates perpendicular to the plane of the hydrogen atoms, i.e., parallel to the molecular axis of symmetry. A double-welled potential occurs for the $\nu_2$ vibration which has the effect of splitting each vibrational state into two levels, one having symmetric and the other having antisymmetric wave functions with respect to the hydrogen plane. These levels are designated "s" and "a", respectively. In addition, "J" is a rotational quantum number representing the total angular momentum of the molecule, "K" is a rotational quantum number representing the component of molecular angular momentum about the unique axis of the molecule, "R" represents a transition wherein the change in molecular angular momentum $\Delta J$ from the lower level to the upper level is plus one, and "P" represents a transition wherein the change in molecular angular momentum $\Delta J$ from the lower level to the upper level is minus one.

As was mentioned above, the pumping laser beam 12 contains a plurality of longitudinal modes and a plurality of transverse modes, i.e., a comb of frequencies spread over an approximately 4 GHz range and centered at a wavelength of about 9.2 μm. When this comb of frequencies irradiates the ammonia gas contained within the housing 20 of the laser 14, the ammonia gas absorbs the pumping laser energy on all of the sR(5,K) transitions, where K=0, 1, 2, 3, 4 and 5, (shown in dashed line in FIG. 2) from symmetric energy substates of the ground (J,K) vibrational manifold to antisymmetric energy substates of the $\nu_2=1$ (J,K) vibrational manifold. Thus, the pumping beam 12 excites ammonia molecules from the s(5,K) substates, where K=0, 1, 2, 3, 4 and 5, of the ground vibrational manifold to respective a(6,K) substates of the $\nu_2=1$ vibrational manifold having the same K value as the associated ground substate. In other words, the s(5,0) ground substate is excited to the a(6,0) $\nu_2=1$ substate, the s(5,1) ground substate is excited to the a(6,1) $\nu_2=1$ substate, etc. The pumping laser beam 12 has sufficient power to simultaneously establish population inversion between each of the excited a(6,K) $\nu_2=1$ substates, where K=0, 1, 2, 3, 4 and 5, and respective s(7,K) substates of the ground vibrational manifold having the same K value as the associated excited a(6,K) substate. As a result, simultaneous laser oscillation is achieved on each of the sP(7,K) transitions, where K=0, 1, 2, 3, 4 and 5.

As the aforementioned a(6,K) $\nu_2=1$ substates are excited by the respective sR(5,K) absorbing transitions, s(5,K) ground substates become depleted in population at a sufficiently rapid rate to permit population inversion to also be established simultaneously between the a(4,K) substates, where K=0, 1, 2, 3 and 4, of the $\nu_2=1$ vibrational manifold and respective s(5,K) ground substates having the same K value as the associated a(4,K) substate. Thus, laser oscillation is also achieved simultaneously on each of the sP(5,K) transitions, where K=0, 1, 2, 3 and 4.

The wavelength of each of the sP(7,K) and sP(5,K) transitions provided in output beam 34 from the laser 14 are given below in Table II, the exact wavelength values being obtained from F. W. Taylor, *Journal of Quantitative Spectroscopy and Radiative Transfer*, Vol. 13 (1973), pages 1181–1217:

TABLE II

| Transition | Wavelength (μm) |
|---|---|
| sP(7,0) | 12.077 |
| sP(7,1) | 12.078 |
| sP(7,2) | 12.080 |
| sP(7,3) | 12.083 |
| sP(7,4) | 12.088 |
| sP(7,5) | 12.093 |
| sP(5,0) | 11.520 |
| sP(5,1) | 11.520 |
| sP(5,2) | 11.522 |
| sP(5,3) | 11.524 |
| sP(5,4) | 11.527 |

As was mentioned above, a laser according to the invention, which simultaneously provides a plurality of output lines at wavelengths quite close to one another, readily facilitates pressure broadening to achieve tunability of the laser output over a wide, continuous wavelength range. In the simplified energy level diagram of FIG. 3 the effect of increasing pressure is shown for the upper and lower energy levels of the aforementioned sP(7,0) and sP(7,5) transitions which lie at the respective extremes of the wavelength rate for the sP(7,K) transitions. As shown at the left side of FIG. 3, for a minimum operating pressure of 0.5 Torr these transitions provide output laser lines at 12.077 μm and 12.093 μm, respectively. However, as the operating pressure is increased, the lower energy levels of these transitions (and also the intermediate sP(7,K) transitions), gradually broaden until a continuous band is reached at a pressure of about 50 atmospheres, as shown at the right side of FIG. 3. It should be noted that pressures of this high a value require the addition of a buffer gas, since in pure ammonia lasing on the transitions in question becomes quenched when the ammonia pressure exceeds about 4.0 Torr. Note also that as the operating pressure is increased, negligible broadening occurs for the upper a(6,K) $v_2=1$ levels of the lasing sP(7,K) transitions.

Figure 3:
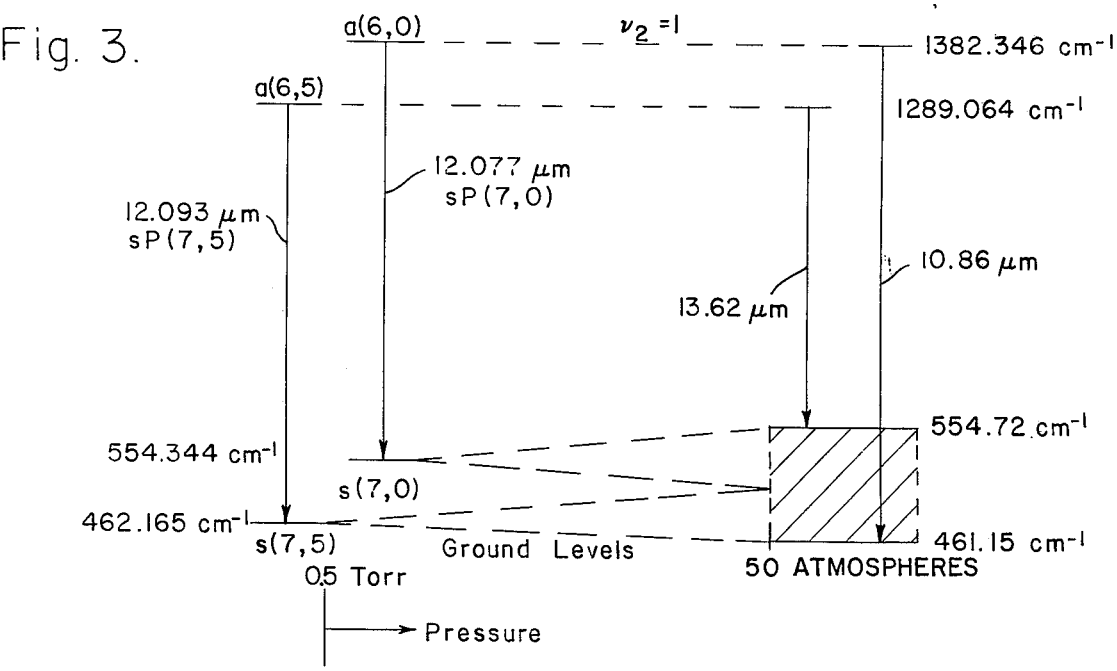
FIG. 3 is a simplified energy level diagram showing the effect of pressure broadening the transitions in a laser according to the invention.

As may be seen from FIG. 3, at a pressure of 50 atmospheres or more, lasing transitions are permitted from any of the a(6,K) $v_2=1$ levels to any energy level within the merged band, which extends from 461.15 cm$^{-1}$ to 554.72 cm$^{-1}$. The transition with the greatest energy change is from the a(6,0) level to the bottom of the band and corresponds to a wavelength of 10.86 $\mu$m, while the transition with the smallest energy change is from the a(6,5) level to the top of the band, corresponding to a wavelength of 13.62 $\mu$m. Thus, for the operating condition depicted at the right side of FIG. 3, the laser may be tuned to provide an output line at any wavelength from 10.86 $\mu$m to 13.62 $\mu$m. Such a tuning range is substantially greater than the sum of the tuning ranges of the individual transitions broadened with the same pressure (50 atmospheres or more). Moreover, when the sP(5,K) lasing transitions are also considered, or when operating at even higher pressures, or both, an even wider continuous tuning range may be achieved.

It is further pointed out that continuous tuning over various smaller wavelength ranges may be achieved at substantially lower operating pressures. For example, considering only the K=0 and K=1 sP(7,K) transitions, which provide respective output wavelengths of 12.077 $\mu$m and 12.078 $\mu$m, a merged band would be formed at a pressure of about 5 atmospheres and allow continuous tuning from approximately 11.998 $\mu$m to approximately 12.159 $\mu$m. In addition, since a laser according to the invention is able to provide pressure broadening over a give wavelength range at lower pressures than the prior art, less pumping power is required to tune the laser over the given wavelength range.

Although the present invention has been shown and described with respect to a particular embodiment, nevertheless various changes and modifications which are obvious to a person skilled in the art to which the invention pertains are deemed to lie within the spirit, scope and contemplation of the invention.

What is claimed is:
1. A laser comprising:
  a housing;
  a quantity of ammonia gas contained within said housing;
  a carbon dioxide laser tuned to the R(30) transition of the 001–020 band for providing a pumping laser beam at a wavelength of approximately 9.2 $\mu$m and having a plurality of longitudinal modes and a plurality of transverse modes;
  means for causing said pumping laser beam to irradiate said ammonia gas;
  said pumping laser beam having sufficient power to simultaneously excite at least two a(6,K) energy substates of the $v_2=1$ (J,K) vibrational manifold of molecules of said ammonia gas to a condition of population inversion with respect to respective s(7,K) energy substates of the ground (J,K) vibrational manifold having the same K value as the associated a(6,K) substate, where K is an integer not greater than 5; and
  an optical resonator in optical communication with said ammonia gas for supporting simultaneous laser oscillation on the respective sP(7,K) transitions corresponding to said condition of population inversion.

2. A laser according to claim 1 wherein said pumping laser beam has sufficient power to simultaneously excite the six of said a(6,K) energy substates characterized by K=0, 1, 2, 3, 4 and 5 to a condition of population inversion with respect to the respective six of said s(7,K) energy substates having the same K value as the associated a(6,K) substate.

3. A laser according to claim 1 wherein said pumping laser beam has sufficient power to additionally simultaneously excite at least one of the a(4,K) energy substates of the $v_2=1$ (J,K) vibrational manifold of molecules of said ammonia gas to a condition of population inversion with respect to the s(5,K) energy substate of the ground (J,K) vibrational manifold having the same K value as said one of said substates, where K is an integer not greater than 4; and
  said optical resonator supports simultaneous laser oscillation on the sP(5,K) transition corresponding to the last-mentioned condition of population inversion and on said respective sP(7,K) transitions.

4. A laser according to claim 1 wherein said pumping laser beam has sufficient power to additionally simultaneously excite at least two of the a(4,K) energy substates of the $v_2=1$ (J,K) vibrational manifold of molecules of said ammonia gas to a condition of population inversion with respect to respective s(5,K) energy substates of the ground (J,K) vibrational manifold having the same K value as the associated a(4,K) substate, where K is an integer not greater than 4; and
  said optical resonator supports simultaneous laser oscillation on the respective sP(5,K) transitions corresponding to the last-mentioned condition of population inversion and on said respective sP(7,K) transitions.

5. A laser according to claim 4 wherein said pumping laser beam has sufficient power to simultaneously excite the six of said a(6,K) energy substates characterized by K=0, 1, 2, 3, 4 and 5 to a condition of population inversion with respect to the respective six of said s(7,K) energy substates having the same K value as the associated a(6,K) substate, as well as to simultaneously excite the five of said a(4,K) energy substates characterized by K=0, 1, 2, 3 and 4 to a condition of population inversion with respect to the respective five of said s(5,K) energy substates having the same K value as the associated a(4,K) substate.

* * * * *